United States Patent Office 3,052,600
Patented Sept. 4, 1962

3,052,600
STABILIZED ORGANIC PHOSPHATE PESTICIDAL COMPOSITIONS IN FUEL OIL
Richard D. Vartanian, Bound Brook, and Robert B. Fortenbaugh, Gladstone, N.J., assignors to American Cyanamid Company, New York, N.Y., a corporation of Maine
No Drawing. Filed June 15, 1960, Ser. No. 36,143
8 Claims. (Cl. 167—42)

The present invention relates to novel organic pesticidal compositions. More particularly, it relates to stabilized organic phosphate pesticidal compositions in fuel oil and to methods for their preparation.

As is known, certain organic phosphorous-containing compounds are highly effective in controlling the annoying presence of mosquitoes, flies and other pests. For instance, commercially available malathion [chemically identified as S-(1,2-dicarbethoxyethyl) O,O-dimethyl phosphorodithioate] is exemplary of an organic phosphorous-containing compound highly effective in controlling a great variety of pests. A method most effective for distributing insecticides of this class is to dissolve such insecticide in an inert solvent and to thereafter spray a given area. Most widely accepted is a spray method termed "Thermal Aerosol Fogging." In brief, this method involves admixing the insecticide with a relatively inexpensive fuel oil and the mixture then pumped through conduits and directing valves to a vaporization chamber. Superheated steam, heated oxygen or heated air sufficient to vaporize the insecticide-fuel oil mixture is then passed around the said vaporization chamber in order to impart sufficient heat to cause vaporization to occur. Vaporized insecticidal composition is ejected as a fog or mist and distributed over a given area.

The latter aerosol fogging technique has made marked inroads in the manner of dispersing insecticides, since it is relatively inexpensive and ordinarily trouble-free with many commercially available insecticides, such as DDT. Unfortunately, this major distribution technique can at times suffer a distinct drawback. In the course of using the aforementioned thermal fogging equipment, it has been noted that frequent shut-down can occur due to clogging of the conduit lines and valves leading to the vaporizing chamber, thereby preventing the fuel oil-insecticide mixture from reaching that chamber. Accordingly, if an insecticidal composition which obviates frequent shut-downs could be provided, it would be highly desirable.

It is, therefore, a principal object of the present invention to provide a novel organic phosphorous pesticidal composition which is incapable of clogging any distributing apparatus. It is a further object of the invention to provide a stabilized organic phosphorous pesticidal composition containing a normally sludge-forming fuel oil. Other objects and advantages will become apparent from a consideration of the following description.

To this end, an organic phosphorous-containing insecticide is stabilized by small amounts of an anionic surface active agent, such as the alkali metal or alkaline earth metal salt of oil-soluble petroleum sulfonates. The anionic surface active agent is present in relatively small amounts. Unexpectedly, it has been found that the mixture of the so-stabilized insecticidal composition when incorporated in a normal sludge-forming fuel oil is so stabilized that deleterious slimy, amorphous precipitates do not form. Rather, a stabilized composition is obtained which can be utilized in any spray apparatus commercially available.

According to the process of the invention, an organic phosphorous-containing insecticide, either alone or in combination with another insecticide and small amounts of a salt of oil-soluble petroleum sulfonates having an average molecular weight of at least about 400 but not more than about 1500 are separately added to inexpensive fuel oils that normally form a slimy sludge when the phosphorous-containing insecticide alone is added thereto. Unexpectedly, a slimy sludge does not form in the fuel oil, although in the absence of the aforementioned anionic petroleum sulfonates a slimy sludge readily forms. Alternatively, a mixture comprising the organic phosphorous-containing insecticide and from about 4% to about 85% of the petroleum sulfonate may be prepared prior to admixture with the fuel oil.

The salts of the petroleum sulfonates contemplated herein are the alkali metal salts and alkaline earth metal salts. Exemplary of the latter metals are sodium, potassium, lithium, calcium and barium.

In general, any commercially available inexpensive fuel oil may be used. Illustrative inexpensive fuel oils which are characterized by their ability to form slimy sludges on addition of an organic phosphorous-containing insecticide are any of those which conform to the specifications set forth in Commercial Standards, CS 12–40 for Nos. 1, 2 and 3 Fuel Oils. Petroleum distillates which generally have an end-boiling point not exceeding 700° F. and preferably below 675° F. for use as diesel fuels are further examples of the type of oils which fall within the purview of the invention.

Advantageously, an organic phosphorous-containing insecticide such as S-(1,2-dicarbethoxyethyl) O,O-dimethyl phosphorodithioate (malathion), O,O-diethyl-O-p-nitrophenyl thiophosphate (parathion), or O,O-diethyl (S-ethylmercaptomethyl) dithiophosphate (phorate) may be admixed with oil-soluble petroleum sulfonate either alone or as a mixture of the insecticide and other insecticides, such as lethane. Alternatively, the oil-soluble petroleum sulfonate and the insecticide separately may be added to the fuel oil. In either procedure, the organic phosphorous-containing insecticide in small amounts, usually in the range of 1% to 10%, and preferably of from 3% to 6%, and from about 0.2% to 5%, and preferably between 0.5% and 1% of the oil-soluble petroleum sulfonate, all based on the weight of the fuel oil, may be so incorporated therein.

It is an advantage of the present invention that other than organic phosphorous-containing pesticides commercially available may be added so as to enhance the over-all composition of the invention. Thus, small amounts, usually in the range of from about 1% to about 10% of insecticides such as lethane (2-butoxy-2'-thiocyanodiethyl-ether) as well as DDT and aldrin, are incorporated in the stabilized, non-sludge forming fuel oil composition of the invention. However, a concentrate absent fuel oil comprising a phosphorous-containing insecticide, another insecticide, lethane for example, present in an amount equal to from about 10% to 100%, and an oil-soluble petroleum sulfonate in an amount equal to from about 4% to about 85%, based on the weight of the phosphorous-containing insecticide, may be prepared and stored prior to admixture with a fuel oil.

A typical formulation of a composition of an insecticide with another additive may be set forth as follows:

| | Parts by weight |
|---|---|
| Malathion (technical) | 47 |
| Lethane | 37.5 |
| Xylene | 7.5 |
| Barium petroleum sulfonate | 8 |

Malathion may be substituted, if desired, in lieu of lethane in the above formulation with equally good results.

In general, admixing about 94 parts of fuel oil with about 6 parts of the above formulation results in sludge-free liquids capable of being used in fogging apparatus. Shut-downs usually caused by formation of slimy precipitates are avoided or minimized.

In order to illustrate the invention with greater particularity, the following examples are presented. These are not to be taken as limitative of the invention but are merely illustrative of the best mode of operation. Unless otherwise noted, the parts given are by weight.

EXAMPLE 1

To 93.5 parts of Fuel Oil No. 2 is added 6 parts of technical grade malathion. Oil-soluble barium petroleum sulfonate (0.5 part) having a molecular weight of approximately 1000 is then added to the mixture and the mixture thoroughly stirred.

After 24 hours, a slimy precipitate did not form in the oil. The mixture is then introduced into the insecticide tank constituting a part of the thermal aerosol fogging equipment known as the "Todd Insecticidal Fog Applicator." When the contents of the tank are pumped to the vaporization chamber prior to ejection from said chamber, the valves and conduit lines leading to that chamber remain unobstructed. No shut-down problem develops due to sludge formation even after continuous and prolonged operation of the fogging apparatus for several weeks.

EXAMPLE 2

Repeating Example 1 in every material respect except that premium grade, substantially odorless malathion is substituted for a technical grade of malathion of Example 1. It is noted that a slimy amorphous precipitate does not form.

EXAMPLE 3

The method of Example 1 is repeated in every material detail except that the oil-soluble barium petroleum sulfonate additive is omitted. Within two hours a thick, dark and slimy precipitate is observed. When the composition of Example 1, omitting the petroleum sulfonate, is added to the insecticide tank of the aerosol fogging equipment, the directing valves in the conduit lines to the vaporization chamber become jammed after several hours of operation, necessitating shutdown for purposes of cleaning out the apparatus.

EXAMPLES 4–11

The following examples illustrate in tabular form data illustrating either the formation of sludge or absence of sludge using the additives indicated and Fuel Oil No. 2.

*Table I*

| Example | Pesticide | Fuel Oil No. 2, percent | Additive | Sludge Formation After 24 Hours |
|---|---|---|---|---|
| 4 | 3% Malathion, 3% Lethane. | 94 | None | Considerable. |
| 5 | do | 93.5 | 0.5% Barium Petroleum Sulfonate. | None. |
| 6 | 6% Parathion | 94 | None | Some. |
| 7 | 3% Parathion | 96.8 | 0.2% Calcium Petroleum Sulfonate. | None. |
| 8 | 6% Phorate | 94 | None | Some. |
| 9 | do | 93.5 | 0.5% Sodium Petroleum Sulfonate. | None. |
| 10 | 6% DDT | 94 | None | Do. |
| 11 | 6% DDT | 93.5 | 0.5% Barium Petroleum Sulfonate. | Do. |

EXAMPLES 12–16

The following examples illustrate the wide range of additive amounts with respect to the fuel oil that can be tolerated in the instant invention. The data is recorded below in Table II. In each example 6% malathion (90% active) is used illustratively.

*Table II*

| Example | Fuel Oil No. 2, percent | Barium Petroleum Sulfonate, percent | Sludge Formation After 48 Hours |
|---|---|---|---|
| 12 | 94 | None | Considerable. |
| 13 | 93.9 | 0.1 | Some. |
| 14 | 93.8 | 0.2 | None. |
| 15 | 93 | 1 | Do. |
| 16 | 89 | 5 | Do. |

It is an advantage of the present invention that the chemical stability of malathion in the presence of both a sludge-forming fuel oil and an anionic additive remains unaffected even after a period of twelve weeks.

We claim:

1. A composition consisting essentially of in combination a normal sludge-forming fuel oil, an insecticidal organic phosphorous-containing compound and a salt selected from the class consisting of oil-soluble alkali metal petroleum sulfonates and oil-soluble alkaline earth metal petroleum sulfonates, said phosphorous-containing compound being present in an amount equal to about 1% to about 10%, and the said petroleum sulfonate additive being present in an amount equal to about 0.2% and about 5%, all based on the weight of the aforementioned fuel oil.

2. The composition of claim 1 in which the insecticidal compound is S-(1,2-dicarbethoxyethyl)-O,O-dimethyl phosphorodithioate and the petroleum sulfonate additive is barium petroleum sulfonate.

3. The composition of claim 1 in which the insecticidal compound is O,O-diethyl-S-(ethyl thiomethyl) phosphorodithioate and the petroleum sulfonate additive is barium petroleum sulfonate.

4. The composition of claim 1 in which the insecticidal compound is O,O-diethyl O-p-nitrophenyl phosphorodithioate and the petroleum sulfonate additive is calcium petroleum sulfonate.

5. In the stabilization of an insecticidal organic phosphorous compound when added to normal sludge-forming fuel oils, the improvement which consists essentially in: adding to said fuel oil from about 0.2% to about 5% of a salt selected from the group consisting of oil-soluble alkali metal petroleum sulfonate and oil-soluble alkaline earth metal petroleum sulfonate and from about 1% to about 10% of said insecticidal organic phosphorous-containing compound, all based on the weight of the fuel oil, and thereafter obtaining the resultant composition as a stabilized insecticidal composition in fuel oil free from sludge formation.

6. The process according to claim 5 in which the insecticidal compound is S-(1,2-dicarbethoxyethyl)-O,O-dimethyl phosphorodithioate and the petroleum sulfonate surfactant is barium petroleum sulfonate.

7. The process according to claim 5 in which the insecticidal compound is O,O-diethyl-S-(ethyl thiomethyl) phosphorodithioate and the petroleum sulfonate surfactant is barium petroleum sulfonate.

8. The process according to claim 5 in which the insecticidal compound is O,O-diethyl O-p-nitrophenyl phosphorodithioate and the petroleum sulfonate surfactant is calcium petroleum sulfonate.

References Cited in the file of this patent

UNITED STATES PATENTS

| | | |
|---|---|---|
| 2,527,987 | Caron et al. | Oct. 31, 1950 |
| 2,626,207 | Wies et al. | Jan. 20, 1953 |
| 2,639,227 | Glendenning et al. | May 19, 1953 |
| 2,866,694 | Glendenning | Dec. 30, 1958 |
| 2,898,267 | Lindner | Aug. 4, 1959 |